(12) United States Patent
Aisa

(10) Patent No.: US 7,423,546 B1
(45) Date of Patent: Sep. 9, 2008

(54) DEVICE, SYSTEM AND METHOD FOR MONITORING A HOUSEHOLD ELECTRIC APPLIANCE

(75) Inventor: Valerio Aisa, Fabriano (IT)

(73) Assignee: Indesit Comapny S.p.A., Fabriano (IT)

( * ) Notice: Subject to any disclaimer, the term of this patent is extended or adjusted under 35 U.S.C. 154(b) by 0 days.

(21) Appl. No.: 10/049,985

(22) PCT Filed: Feb. 1, 2000

(86) PCT No.: PCT/IB00/00096

§ 371 (c)(1),
(2), (4) Date: Feb. 20, 2002

(87) PCT Pub. No.: WO01/15300

PCT Pub. Date: Mar. 1, 2001

(30) Foreign Application Priority Data

Aug. 20, 1999 (IT) .............................. TO99A0720

(51) Int. Cl.
*G08B 21/00* (2006.01)
(52) U.S. Cl. .................. 340/679; 340/635; 340/657; 340/660; 340/661; 340/664
(58) Field of Classification Search ............... None
See application file for complete search history.

(56) References Cited

U.S. PATENT DOCUMENTS

| | | | |
|---|---|---|---|
| 4,644,320 A * | 2/1987 | Carr et al. ............... | 340/310.06 |
| 4,706,153 A * | 11/1987 | Sainomoto et al. ............ | 361/42 |
| 5,428,342 A * | 6/1995 | Enoki et al. ................ | 340/511 |
| 5,670,074 A * | 9/1997 | Kass et al. ................. | 219/481 |
| 5,680,445 A * | 10/1997 | Bogner et al. ............ | 379/106.01 |
| 5,711,606 A * | 1/1998 | Koether ..................... | 374/149 |
| 2001/0025349 A1* | 9/2001 | Sharood et al. ............. | 713/340 |
| 2002/0035757 A1* | 3/2002 | Ciancimino et al. ............ | 8/159 |

FOREIGN PATENT DOCUMENTS

| | | |
|---|---|---|
| DE | 19725880 C1 | 4/1999 |
| EP | 0535631 A1 | 4/1993 |
| EP | 0550263 A2 | 4/1993 |
| EP | 0727668 A1 | 8/1996 |
| JP | 08009569 A | 6/1994 |
| JP | 10248164 A | 9/1998 |

* cited by examiner

*Primary Examiner*—Julie Lieu
(74) *Attorney, Agent, or Firm*—Cesari and McKenna, LLP; Patricia Sheehan

(57) ABSTRACT

A device is described, for monitoring a household electric user (COT, LB, AU), in particular a household appliance, presenting an electric load, where said monitoring device (AI) is connected between a source of electric energy (PDC) and said electric load, said monitoring device (AI) comprising measuring means (A) for detecting the quantity of electric power or current absorbed by said user (COT, AL, AU), characterized in that said monitoring device (AI) comprises control means (SC), which are programmed for: comparing the absorption of electric power ou current measured through said measuring means (A) with reference values of electric power or current, which are stored within said control means; generating, in function of said comparison, information which being representative of the present status or phase of operation of said electric user (COT, LB, AU); allowing said information to be read from outside said device (AI).

50 Claims, 3 Drawing Sheets

DEVICE, SYSTEM AND METHOD FOR MONITORING A HOUSEHOLD ELECTRIC APPLIANCE

FIELD OF THE INVENTION

The present invention relates to a device, a system and a method thereof for monitoring a household electric user, in particular a household appliance.

It is known that household electric users can be classed in two basic groups, i.e. users fitted with sophisticated control systems capable of dialog exchange with peripheral and external equipment, and more conventional users developed according to a "stand-alone" philosophy.

A common attribute for both groups of users is to be "user friendly", i.e. allowing their use in an efficient manner, either when installed alone or inserted in a more complex context (such as a home automation system) and allowing both their maintenance and technical service in a most efficient way as possible.

It is known, for instance, that the components of certain household electric users, such as household appliances, are subject to wear and occasional faults and how repair operations in consequence of such faults are required in the daily practice.

Some household appliances may be equipped with a sophisticated electronic control system, provided with specific sensing means, through which the nature of a malfunction can be identified substantially in real time and appropriately signalled for its subsequent easier repair.

However, in most conventional household appliances, the identification of the fault nature of a component by the technical service personnel is not immediate; in fact, said personnel is often forced to check several components of the household appliance and/or simulate the performance of a standard work program in order to identify exactly the instant when such a malfunction occurs, and from this result attempt to go back to the actual origin of the problem.

This may entail several difficulties and a considerable waste of time, which reflect negatively on the costs of repairing.

On the other hand, it is also known that the "preventive" maintenance or servicing activity, being intended as the activity associated to the direct or indirect control of the wear status of some components of a household appliance, is practically non-existent so far.

Such an activity, in fact, is nearly exclusively restricted to the advice for the user to let the function or wear status of certain components be checked after a certain period of time elapsed from the installation date of the household appliance or from a previous maintenance operation.

However, such an approach does not ensure an actual control of the wear status of the components of the household appliance, on account of their real exploitation, nor a prompt detection of initial signs of irregularities in the appliance operation before the latter may turn into a problem for the person using the appliance (hereinafter referred to as "consumer").

Let us think, for instance, of a household appliance (and in particular, to one of its specific operation programs) being used more frequently with respect to usual utilization standards, or vice-versa of a household appliance used only inconstantly with respect to the standard practice (and without a specific intensive use of a specific program).

It is obvious that, in the first case, a certain component of the household appliance will wear out much earlier than the "estimated" date for its replacement, whereas, in the second case, the component may be replaced earlier than necessary during a planned maintenance operation, even if not actually worn.

The present invention is based on the acknowledgement of the fact that it would be highly advantageous for the serviceman called for repair or maintenance operations to avail himself of information relating to the operating status and the "historical" events of a household electric user, above all if the latter is not equipped with a proper sophisticated "self-diagnose" system for the identification of faults or malfunctions.

Accordingly, the idea at the basis of the present invention is to provide a monitoring device which can be associated in a simple and fast manner to a generic household electric user, the latter being in particular deprived of dialog capability with the external environment, and which is capable of generating at least information of the diagnostic and statistical type, i.e. information representative, on one hand, of likely malfunctions the electric user is subject to (including those faults not directly detectable by the user) and, on the other hand, of the type of activity performed in the past by the electric user itself.

In this way, through the association of the above monitoring device to a household electric user, the possibility is offered to efficiently identify and/or signal the nature of a malfunction as soon as it occurs, and to detect any initial signs of operation irregularities of the electric user itself, before this may become a problem for the consumer. Similarly, through such a monitoring device it is possible to detect both the conditions and modes of use of the electric user in the time, for allowing a sufficiently exact estimation of the wear status of its internal components.

Other typical problems concerning most conventional electric users, i.e. those without a sophisticated control system, are related to home automation, which presumes a connection in a network of the household appliances, or more in general of the various electric users in the house.

In particular, such a connection to a network has an important role with reference to the automatic management of the electric power absorption in the home, in view of:

solving the problem of accidental power black-outs, due to the operation of the limiting device (usually a thermal device sensing the current quantity flowing through it) associated to the maximum value of the usable electric power (contractual power value) being defined in the power supply contract;

limiting the electric power absorption below a determined level, in order to avoid the so-called absorption "peaks" and favoring important upstream savings, by virtue of a better planning of the electric energy production.

According to the present state of the art, two different modes are known, of automated managing of the household absorption of electric power, whose object is to rationalize the consumption both during the day and at night.

The first procedure, which is the widest spread, is based on a centralized system, where the individual household electric users have their absorption coordinated by an appropriate supervision apparatus, which carries out the following functions:

allowing the consumer to set the priorities to be associated to the various household electric users;

measuring the total electric power absorbed by the household environment and comparing it with the maximum value allowed by the power supply contract;

authorizing the power absorption of the various users fitted with a sophisticated electronic control system, being programmed to that purpose, in view of reconciling the requirements they present to the central supervision apparatus with the priorities set by the consumer and the maximum value of total electric power which can be supplied according to the power supply contract (contractual power value);

controlling directly appropriate "smart sockets", through which the electric supply can be cut off to those household electric users which, being for example deprived of a sophisticated electronic control system, are unable to negotiate the quantity of electric power required for their operation directly with the central supervision apparatus;

planning the absorption of electric power both during day time and night time, in order to ensure a temporal distribution of the electric energy consumption as much constant as possible;

reacting to situations of electric power absorption exceeding any limit situations set forth by the power supply contract (contractual power value), through the deactivation of all electric users associated to the above "smart sockets", on the basis of the priorities assigned by the consumer (i.e., the electric user having the lowest priority is the first to be deactivated).

The main drawbacks of such a first known centralized managing procedure are substantially as follows:

an interaction of the consumer with the central supervision apparatus is required; considering that the latter has a certain complexity level, its use is not suitable for everybody;

the central supervision apparatus has to be programmed by a technician; moreover, considering that the correct system configuration depends upon both the number and the type of electric users being present in the household environment, any addition or removal of electric users will require a new system configuration;

the situations of excessive electric power absorption cannot be managed in an efficient way, since the main supervision apparatus simply provides for a complete deactivation of the users having the lower priority, in particular ignoring their current operating status or program.

In order to clarify the non-efficiency concept expressed in the above last point, let us to consider the case where the deactivated electric user is a washing machine performing its water heating phase; in this event, the complete power off of the machine hinders the exploitation of the thermal power accumulated in the water up to that time.

Vice-versa, such an exploitation would have been possible by letting the washing machine to continue at least to rotate its drum (e.g. just 0, 1 kW of power), as in this case only water heating is inhibited (generally associated to a power absorption of 2 kW).

The second mode of automated managing of the electric power absorption, being known from EP-A-0 727 668, is less spread than the centralized procedure, but it allows to overcome the previous problems, since it is based on a system architecture with "distributed intelligence", which does not require a central controller.

To ensure correct operation, such a mode presumes:

the availability of a meter of the total electric power or current absorbed in the household environment, which is capable of spontaneously communicating the measured value to all the electric users connected to a suitable household bus;

the presence of electronically controlled electric users, which are programmed for self-adjusting their own electric power absorption on the basis of the actual available power and in relation to their relevant priorities.

The managing procedure disclosed in EP-A-0 727 668 has the advantage, with respect to the centralized procedure, that no intervention from the consumer is required (since no active central control unit is present), while an improved exploitation of the electric users is allowed.

The advantage of the better exploitation of the electric users is due to the fact that their self-adjusting capability (obtained through an appropriate "metering" of the power absorption, being consistent with the actual availability of power of the whole household environment at the moment) allows the simultaneous activation of several appliances without the risk of exceeding the maximum absorption of electric power (contractual power value).

However, the solution described in EP-A-0 727 668 has a drawback in that the conventional electric users (or the user anyway not programmed for self-adjusting their own power absorption) are unable to contribute in an active and efficient way to the automated managing system of the household power absorption.

Accordingly, the present invention has also the aim to indicate a monitoring device which can be associated in a simple and fast manner to a generic household electric user, the latter being in particular deprived of dialog capability with the external environment, and which is capable of generating at least information of the functional type, i.e. indicating the current operating mode of the electric user itself, to be used for realizing a more efficient management of the electric power absorption.

In this way, through the association of the above monitoring device to a generic household electric user; it is possible to extend also to conventional electric users (or not programmed to that purpose) the advantages being proper of the network connection of the products equipped with sophisticated electronic control systems; all the above for allowing to keep the electric power absorption below a maximum limit.

On the basis of the above considerations, it is the main aim of the present invention to provide a monitoring device capable of generating, and eventually storing in a non-volatile but updatable memory, information of the diagnostic and the statistical type relating to a household electric user, in order to let said information available for any person called for repair or maintenance operations to the electric user itself.

Another aim of the invention is to provide a monitoring device which allows the possible transmission of the information generated and/or stored by it to an appropriate external location, in view of allowing a remote service assistance, even of the "preventive" type, of the relevant household electric user.

A further aim of the invention is to provide a monitoring device which, whenever required, is capable of generating information relating to the current operation status of the electric user associated to it, which information are useful for an efficient management of a system for rationalizing the energy consumption in a household environment.

A further aim of the invention is to provide a monitoring device which, whenever required, allows for realizing a remote control of the operation of a household electric user, also from a location outside the household environment wherein the electric user is installed.

A further aim of the invention is to provide a monitoring device which can be adapted to various types of household electric users and which, for said reason, can be variably configured in a simple and cost-effective way.

One or more of the above aim and further ones that will become apparent later are achieved according to the present invention by means of a device, a system and a method for monitoring a household electric user, in particular a household appliance, incorporating the features of the annexed claims, which form an integral part of the present description.

Further aims, features and advantages of the present invention will become apparent from the following detailed description and the annexed drawings, which are supplied by way of non limiting example, wherein:

DETAILED DESCRIPTION

Figure 1:
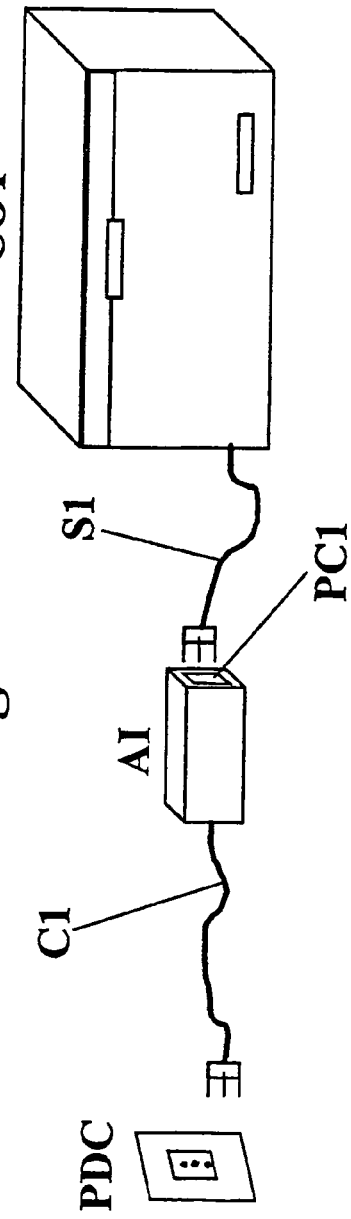
FIG. 1 shows schematically a monitoring device according to the present invention, associated to a generic household electric user.

In FIG. 1, Ai indicates a monitoring device according to the present invention, which is connected in use between a conventional household electric user, indicated with COT, and a standard current socket, indicated with PDC, available in any household environment. In the non limiting example of FIG. 1, the above household electric user COT consists of a horizontal freezer, also known as a pit freezer.

For the purposes of the above connection, the device AI is fitted with its own current socket PC1, wherein the plug S1 of the supply cable of the freezer COT is to be inserted, and with a supply cable C1 for connection to the household current socket PDC.

Therefore, as it can be noticed, the physical connection of the monitoring device AI to the relevant electric user COT is quite simple, along the electric supply line of the latter.

Figure 2:
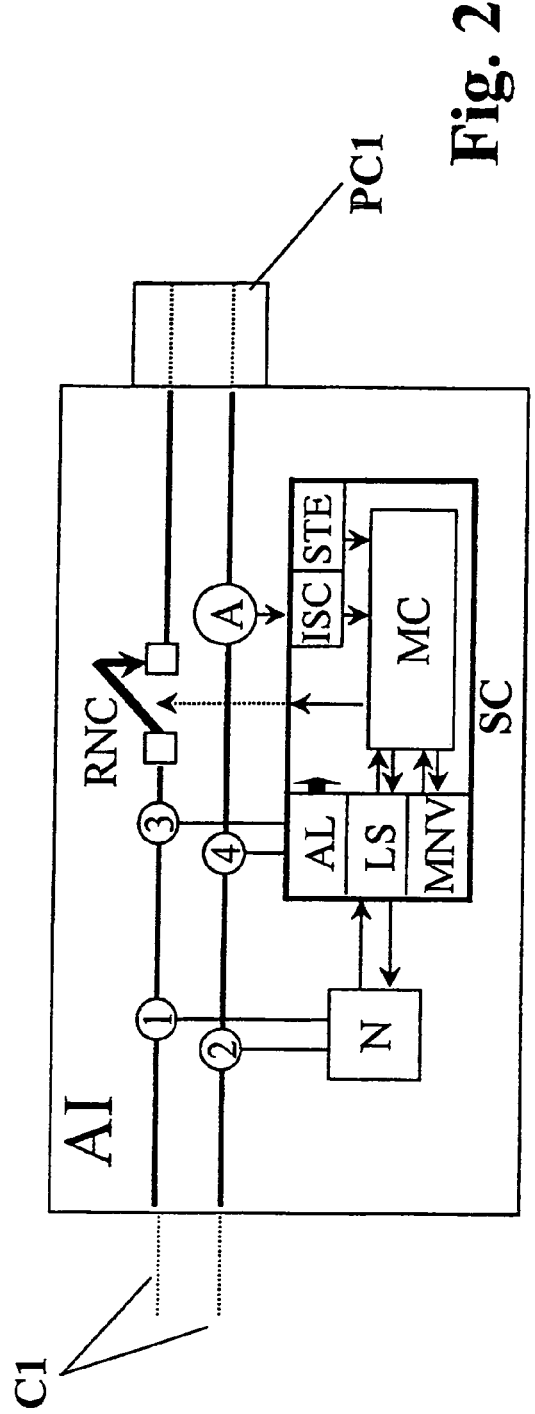
FIG. 2 shows schematically a first possible embodiment of the monitoring device according to the present invention.

The internal components of the device AI, according to a first possible embodiment, are represented schematically in FIG. 2.

In this figure, N indicates an interface module (of known operation and manufacture) to a communication network, or bus, consisting of the same electric network (power line carrier) being present in the household environment where the electric user COT is installed. This interface module forms the "communication node" through which each device connected to it is able to exchange information with the external environment through the known "carrier current waves" technique. Therefore, each communication node has appropriate interface means to the communication network itself and contains, additionally, the control logic for managing both the communication protocols towards the bus (in other words, the rules governing the information exchange with the other network nodes) and the information exchange with the associated device.

The technology related to the network communication nodes and the relevant protocols are known (reference is made for example to household bus systems such as LonWorks, CEBus, EHS, EIB . . . ) and therefore it is not further described herein.

Here it will be enough to point out that the module N contains the resources required for managing both the transmission and reception of information through the same electric line, to which the module N of the device AI is in fact connected through appropriate terminals 1 and 2, and its relevant communication protocols.

With RNC a normally closed relay is indicated, whose purpose is to impose—if required and on request of a microcontroller MC pertaining to the control system SC of the device AI—an interruption of the electric mains to the user COT. As it will be further seen, such an ON/OFF activity performed by the relay RNC of the device AI with respect to the relevant electric user may be performed within the frame of a process for adjusting the electric power absorption inside a household environment.

It will be noticed, anyway, that the availability of the relay RNC should be considered merely optional, in that it may be provided in those cases where, due to the high value of power installed in the electric user (such as an iron, an electric stove, a bread toaster, etc.), acceptance of the compromise of a management of the ON/OFF type is considered useful for adjusting its power absorption.

With A is indicated a generic current sensor, of known type, which has the function of detecting the quantity of current absorbed instant by instant by the electric user COT associated to the device AI, and consequently informing the already mentioned microcontroller MC, through a suitable interface ISC of the known type. By mere way of non limiting example, the sensor A may consist of a simple shunt (power resistor with a very low ohmic value) whose voltage at the terminals, being proportional to the current flowing through it, is duly measured by an 8-bit analog-digital converter, such as the one already fitted on the majority of low-cost microcontrollers in trade.

With SC the electronic control system of the monitoring device AI is indicated as a whole, which comprises:

- an electronic microcontroller MC,
- a non-volatile memory MNV, such as an EEPROM or Flash memory,
- a voltage supplier AL, connected to the mains voltage by means of appropriate terminals 3 and 4, and which is provided for generating a continuous stabilized voltage as required for supplying the entire control system SC,
- an interface ISC for connecting the microcontroller MC to the current sensor A,
- a serial line LS for connecting the microcontroller MC to the interface module N,
- a selector STE for selecting, among a plurality of possibilities, the type of household electric user to which the device AI is associated.

All the above components of the device AI are individually known to the man skilled in the art, so that their detailed description is not required herein.

The innovative functions of the monitoring device AI according to the present invention are instead based on the two following main aspects:

- continuous measurement of the current absorbed by the electric user COT, through which the control system SC of the device AI is able to generate, and eventually store, at least information of the diagnostic and statistical type, which are useful for repair and/or technical service purposes of the user COT itself;
- dialog possibility with the external world, in order to make the above information available, for example to a managing system of the electric energy consumption, or to the personnel of a Service and Maintenance Centre.

The first aspect, in particular, represents the main innovative element of the present invention, since it sets forth that, through the study of the current absorptions of the electric users to which the device AI is associated to, it is possible to generate information which allow for evaluating the functional status of the electric user and identifying the type of work cycle or program being performed by the same electric user. Moreover, on the basis of the past history (i.e. the number and the type of work cycles performed), properly stored in a suitable permanent memory (such as an EEPROM or FLASH memory), the "wear status" of the main components of the electric user itself can be estimated and, consequently, an appropriate preventive maintenance plan can be elaborated.

From the analysis of the profile of the current absorptions, which the microcontroller MC carries out by interpreting the measurements performed by the sensor A, it is in fact possible, by knowing the type of electric user connected to the device AI, to monitor said user, to identify the number and type of work cycles performed both instantaneously and day by day, as well as to detect possible faults. This is obtained by comparing, through an appropriate software of the microcontroller MC, the profiles of absorbed current detected through the sensor A with reference profiles being representative of normal operating conditions of the electric user, and contained in the memory of the microcontroller MC itself.

The above reference profiles are conveniently coded in the memory of the microcontroller MC, on the basis of the results of experimental analysis performed on various types of products, to which the device AI can be associated to.

For a better understanding of the above concept of "reference profile" of current absorption, let us now consider for instance a standard operation cycle of a laundry washing machine which, starting from its initial phase, may typically comprise the following steps:

the opening of a solenoid valve for the water intake from the household water mains;

the switching of an electromechanical pressure-switch upon reaching a determined water level in the machine tub, with the consequent closure of the above solenoid valve;

the activation of an electric heater for heating the water in the tub;

the detection, by means an appropriate sensor, of the achievement of the water temperature as provided for by the wash cycle, with the consequent deactivation of the above heater;

the activation, for a determined time, of the electric motor causing the rotation in both directions of the washing machine drum containing the laundry;

the activation of a pump for the wash water discharge, and so on for all the operations which are progressively executed during the various phases of the selected wash cycle.

It is obvious that the above operations cause, into substance, a determined sequence of current absorptions from the electric mains by the washing machine, which differ between them; such a sequence of absorptions or current "profiles" may be described by means of appropriate parameters (a set of current absorption values correlated to their relevant duration), which are obtained through experimental activities, which constitute the "reference profiles" for the above household appliance.

Therefore, the memory associated to the micro-controller MC will contain a plurality of such reference profiles, each one of them relating to a given household electric user and representative of its usual operation. When installing the monitoring device AI, the associated electric user will be selected through the setting means STE of FIG. 2, along with, consequently, the relevant reference current profiles which the control system SC will use for monitoring the correct operation of the electric user itself and for obtaining the information relating to its modes of use, both instantaneous and in time.

By way of example, the above setting means STE may consist of a set of micro-switches, of the dip-switch type, each one featured by an ON (logic level "1") and OFF (logic level "0") position, in such a number to permit an adequate plurality of binary combinations. For instance, by a dip-switch with four micro-switches, one among 16 different electric users can be selected, to which the relevant operation profiles will be associated. Or, presuming always by way of example, the use of two dip-switches with 4 switches each, the first one may be associated for selecting the electric user family (such as refrigerating appliance) and the second for the product type (such as a horizontal freezer, or a simple refrigerator or still a refrigerator-freezer with a single compressor, or a refrigerator-freezer with two compressors, etc. . . . ).

From the above, it is clear how the microcontroller MC on receiving information of the type of electric user and the relevant reference profiles is able to detect with good approximation the operations being performed by the electric user and likely faulty operating conditions, on the basis of the current absorption actually detected instant by instant though the sensor A.

Obviously, different operation programs of a laundry washing machine determine, in general, current absorptions with different duration and different distribution in time, i.e. different reference profiles. In fact, in the case of a strong wash cycle, the water heating will be at a high temperature (e.g. 90° C.) and, additionally, the motional steps of the machine drum containing the laundry will be stronger (i.e. rotation phase lasting longer than rest interval); on the contrary, a wash cycle for delicate laundry will have water heating at a lower temperature (e.g. 40° C.) and a short and light drum motions.

Therefore, in the first instance (strong wash cycle), the current absorption time required by the water heater and the drum motor will last considerably longer compared to the second instance (delicate wash cycle).

Analogous considerations can obviously be made also with reference to other household electric users, being able to perform a plurality of different functions or work cycles as selected by the user, such as a dishwasher, an oven, a laundry dryer, and so on.

Therefore, as it can be seen, through the analysis of the current absorptions, the monitoring device AI is perfectly capable of recognizing with good approximation the operation cycle (or program) being performed by the electric user; now, if an appropriate non-volatile memory of the EEPROM or FLASH type is available, the device AI is also capable of permanently storing both the number and the type of performed programs, i.e. the history of the modes of use of the electric user.

It is also quite clear how the monitoring device AI, based on the above analysis principle, is capable of recognizing not only the number and type of programs performed, but also capable of detecting possible malfunctions of the electric user.

Let us still consider, by way of example, the same instance of a laundry washing machine, which is usually fitted with a wash water heater whose power is in the order of 2 kW. It is clear that in case the monitoring device AI, following the start of a machine cycle, does not detect the typical current absorption caused by the heater activation, this is indicative of a possible malfunction of the heater, or of the system controlling its activation.

Another example may be described in relation to the analysis of the operation ratio or duty cycle of the compressor of a refrigerator or freezer, i.e. the compressor ON time referred to the total cycle time (ON time+OFF time). It is in fact clear that if, at a same room temperature detected in a known way, the compressor activation time (whose current absorption is detected by the device AI) tends to slowly but gradually increase in time, this indicates a malfunction which is reducing the efficiency of the refrigerator, probably due to a leakage of the refrigerating fluid caused by micro-fractures in the refrigeration circuit ducts (typically in correspondence of welds), or to an unusual ice accumulation in correspondence of the evaporator area, leading to a consequent less efficient thermal exchange with the environment inside the refrigerator itself.

Another type of detection of malfunction, also related to a refrigerating appliance, may be referred to the analysis of the compressor "spurt", i.e. the transitory current over-absorption which occurs in occasion of the activation of the compressor itself. In particular, if such a spurt is shorter than normal, this means that the compressor is encountering a low resistance torque associated to the starting of the circulation of the refrigerating fluid within the refrigeration circuit. This circumstance may indicate that the quantity of the refrigerating fluid available in the refrigeration circuit is reduced, due to micro-fractures as described above.

Another type of detection of malfunction, also referred to a refrigerator, concerns the situation where, due to a high temperature of the external environment (detected with known means by the monitoring device AI), the compressor remains permanently active, so causing an excessive accumulation of ice on the evaporator area, and consequently a gradual performance degradation, also associated to a very high power consumption. This is caused by the excessive thermal dispersions towards the external environment, which hinders to reach the compressor deactivation threshold, being managed by a conventional electromechanical thermostat. In such an event, the monitoring device AI, after easily detecting the malfunction, can solve the problem causing a forced pause to the compressor by interrupting the supply voltage. This interruption of the supply voltage, obtained by activating the relay RNC (FIG. 2) will last enough to allow the complete defrosting of the evaporator area, the value of such a duration being a parameter contained in the memory of the microcontroller managing the monitoring device AI itself.

Finally, another type of detection of malfunction, related to the instance of a freezer, concerns the possibility of identifying a faulty condition of the compressor. A prompt detection of such a condition, which is very simple since being associated to an excessively long pause of the compressor (compared to those of normal cycling, being stored in the memory of the microcontroller of the device AI), is quite important if combined with an alarm signalling system (such as the activation of an acoustic alarm, or a remote signal), since it will protect the integrity of the preserved food.

So far, only the measurement of the current absorbed by the electric user monitored by the device AI has been taken into consideration, in view of its higher simplicity and lower costs reasons; however, it is clear that what said above is perfectly valid also when the electric quantity being measured is not the current alone, but the active power absorbed. Therefore, the monitoring device AI is capable, by virtue of an appropriate programming, of generating locally, and on the basis of the analysis of the current or power absorbed by the associated electric user, different types of information.

As it is clear from the above, for the purposes of the present invention, such information can be distinguished into information of the functional, diagnostic and statistical type. Information of the functional type relate to the present operational modes of the electric user connected to the device AI. Such information are obtained, as said, by comparing the instantaneous absorption of current or power by the user with the relevant reference absorption profile, which fact let the device AI to recognize, with a good approximation, what the electric user is doing and make such information available outside.

The information of the diagnostic type relate to the operating quality of the household electric user, i.e. they supply indications on the efficiency or functional status of its components. Such information are the result of the detection, by the monitoring device AI, of deviations which are considered significant between the current or power absorption measured for the user and the one defined by the relevant reference absorption profile. The information of the diagnostic type are stored by the microcontroller MC in a special area of the memory means MNV, and are then available for technical service purposes.

The information of the statistical type relate on the other hand to operation statistical data, which practically represent "the history" of the electric user (both from a standpoint of its operations and/or functions performed, and the modes of use by the consumer), which are suitable for supplying indications concerning the wear status of the components of the electric user. These information consist practically of the number and type of work cycles or programs performed by the electric user, which the microcontroller recognizes through an appropriate program utilizing the same junctional information, and which the microcontroller stores and updates in time in a suitable area of the memory means MNV.

Figure 3:
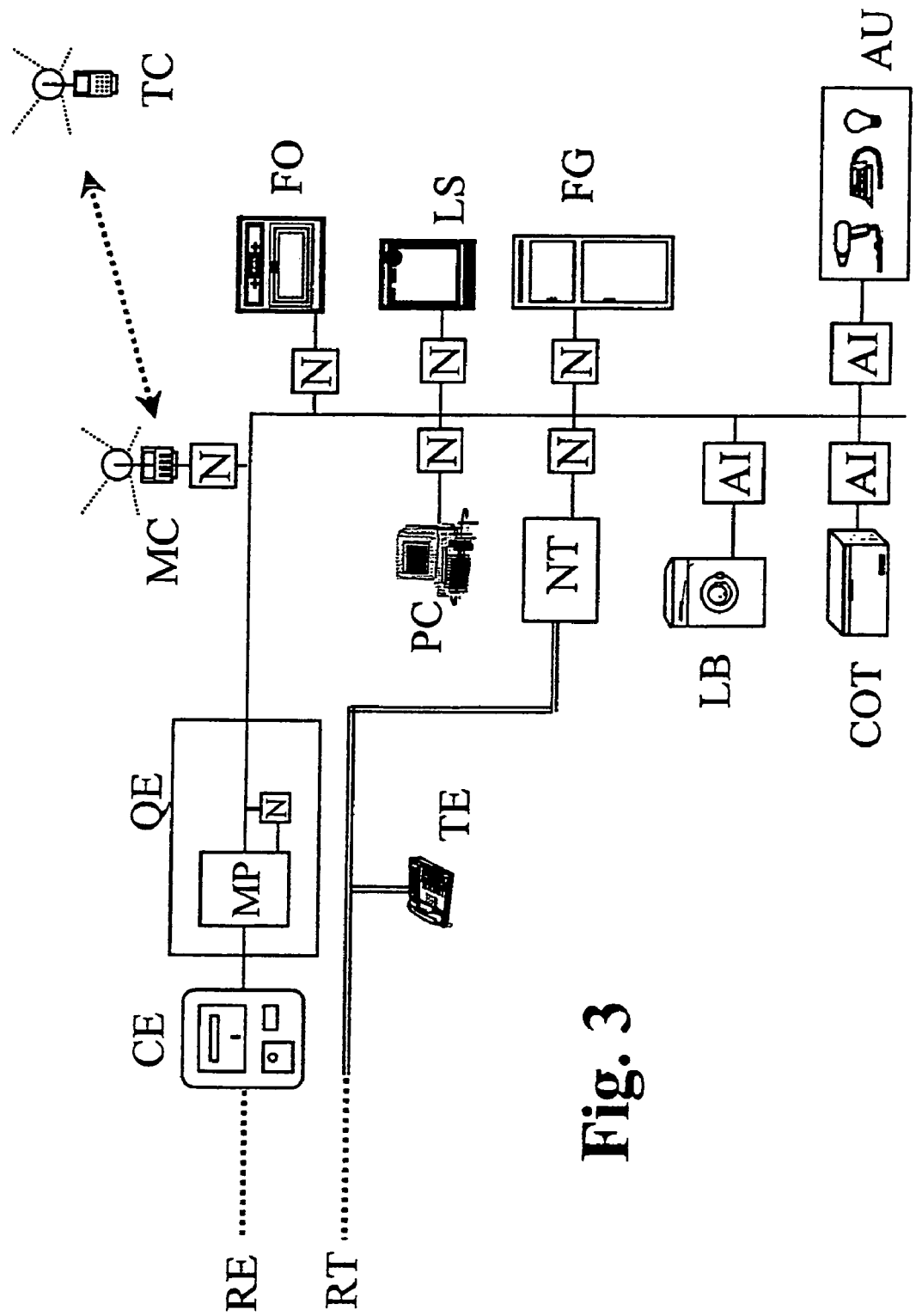
FIG. 3 shows schematically a system of household electric users, where the monitoring device according to the present invention can have a particularly advantageous application.

As it will become further apparent with reference to the application example represented in FIG. 3, the information of the functional type may also be used for the purpose of realizing a rational management of the consumption of electric energy in a household environment, or for allowing the remote control of the electric user connected to the device AI. The information of the diagnostic type are used, on the contrary, for making easier the servicing of the electric user they refer to.

Finally, the information of the statistical type are used for carrying out an estimation of the wear status of the components constituting said electric user, in order to allow the planning of appropriate preventive maintenance activities.

In FIG. 3 a possible application of the device AI according to the present invention is represented.

A system is schematically represented in this figure, consisting of a plurality of household electric users connected through an appropriate communication network, whose purpose is to rationalize the electric power absorption of said users and avoid exceeding a determined prefixed power limit, which is represented by the value of the contractual power or another limit value being established for convenience by the consumer.

The general structure of the system represented in FIG. 3 is of the type described in EP-A-0 727 668, whose teachings in this connection are herein incorporated by reference.

Accordingly, some household electric users (FO, LS, FG) are conveniently pre-set for dynamically self-adjusting their own electric power absorption, constantly adapting it to the global energy requirements of the household environment where they operate, as they may change during the day.

In other words, according to the invention, such electric users are equipped with respective "smart" control systems, which have at least the following essential features:

1) Capability of receiving, through an appropriate transmission means and an appropriate electronic interface, the information concerning the total power absorbed (or, more simply, concerning the total current absorbed) by the household environment, along with the prefixed maximum limit for such an environment, said information being supplied by a suitable metering device fit to that purpose. The exemplification relating to the measurement of current, instead of power, is justified in that the device for limiting the maximum value of power which can be used according to the supply contract is typically a thermal limiter, whose cut-off intervention of the power mains is caused by the heating due to the current flow.

2) Capability of interpreting the information concerning the total power absorption in function of the limit of maximum power which can be supplied as defined in the power supply contract (contractual power), or in function of a convenience limit (such as related to a lower cost of the electric energy) prefixed by the consumer.

3) Capability of constantly managing its own power absorption, coherently with the specific function of the respective electric user and, as far as possible, with the function performed by the other electric users in the home it is able to communicate with.

Point 1) above indicates the need of means suitable for measuring the electric power (or, more simply, the current) absorbed by the household environment and the need of having an adequate communication system between the above measuring device and the electric users properly fitted with a dynamic self-adjustment system of their own power absorption. Points 2) and 3) above indicate the need of fitting the household electric users with a control system which is capable, on the basis of the information transmitted by the power (or current) measuring device, of contributing to maintain the total power (or current) absorption of the whole household environment below a maximum limit (either set forth by the power supply contract or set by the consumer for personal convenience), searching from time to time the best possible compromise between the need of reducing the absorbed power and ensuring anyway an acceptable performance.

To this purpose, in FIG. 3 RE indicates a communication network of the household environment, to which the various household appliances are connected to. In the example, the network RE consists of the same household mains system and the communication system among the various household appliances is of the power line carrier type. This communication system is known and used for information exchange between various interface modules, indicated with N, through the same supply cable of the electric user, i.e. without having to implement a complementary wiring system in the house.

Each interface module N, also called "communication node", comprises for example a suitable microcontroller managing the communication protocol (i.e. the set of rules by which the microcontroller exchanges information with the other nodes of the network), and an appropriate electronic interface comprising a bi-directional modem for power line carrier of the half-duplex type (i.e. capable of exchanging information in both directions but at different times) and a suitable hardware interface towards the communication line, which, in the example, is represented by the power mains RE itself, as mentioned above. CE indicates a common power meter being associated to the household environment to which the system of FIG. 3 relates. Location of such a meter CE is presumed at the entry of the household electric installation, even if in reality it is often placed on the ground floor (in the case of a condominium), or outside the building itself (in the case of one-family houses), said location being anyway irrelevant for the purposes of the present invention.

QE indicates the main electric board, which is located directly downstream the meter CE, or anyway at the entry of the household environment; it contains; besides the conventional actuation devices (switches) and safety devices (power limiters, "life savers", etc. . . . ), an appropriate device MP connected to the network through a relevant communication node N, which is capable of constantly measuring the value of the total power (or current) absorbed by the household environment and sending on the network such a measurement value, along with the value of the maximum limit of usable power (or current).

FO, LS and FG indicate an oven, a dishwasher and a refrigerator, respectively, each one being fitted with an appropriate electronic control system, whose functions are as previously mentioned with reference to EP-A-0 727 668, adequately connected to the network through a relevant interface module N. For the above reasons, household appliances FO, LS and FG will also be indicated in the following as "smart" household appliances or electric users.

LB and COT indicate a laundry washing machine and a freezer, respectively, having a conventional control system (i.e. either electromechanical or electronic, but having no capabilities as indicated above with reference to EP-A-0 727 668), whereas AU indicates as a whole a set of other electric users being present in the home (such as an iron, a hair-dryer, a lighting system, etc.); the household appliances LB and COT, as well as the electric users AU are not intelligent or "dummy", i.e. unable to self-adjust their own power consumption on the basis of the information supplied by the power (or current) measuring device MP located at the entry of the electric installation.

However, such conventional users LB, COT and AU may be turned into active part of the self-adjustment system of power absorptions by means of the relevant devices AI according to the present invention. In such an application, the control system SC of every monitoring device AI is obviously programmed for "emulating" the capabilities pertaining to the control systems of "smart" household appliances; accordingly, the control system SC of the various monitoring devices AI will be able, on the basis of the information transmitted on the network by the measuring device MP, to contribute to maintain the total power absorption of the whole household environment below a maximum limit (set forth by the power supply contract or set by the consumer for his personal convenience), searching from time to time the best possible compromise between the need of reducing the absorbed power through ON/OFF actions on the supply of the relevant electric user which are carried out by means of the normally closed relay RNC (FIG. 2), and the need of ensuring anyway an acceptable performance of the electric user itself.

It will be appreciated that, since the monitoring device AI according to the invention is able to known the cycle phase reached by the relevant electric user, such ON/OFF action on more than one appliance can be decided on the basis of performance priority rules.

Since the device MP has to measure the total power (or current) absorbed by the household environment, it refers to the initial non-sectioned length of the power mains RE; through the relevant interface module N, it is able to send directly on the network RE the information containing the value of the total power (or current) absorbed by the household environment and the value of the allowed maximum limit (contractual power or other value established by the consumer for convenience).

The control logic, of the meter MP, based on the use of a nicroprocessor, performs at least three substantial functions:
  the function of measuring the total active power (or current) absorbed by all the electric users being present in the same household environment;
  the function of sending such information, along with the information relating to the maximum limit of absorbable power (or current), on the same electric mains RE through the power line carrier system and the communication node N;

the function of establishing the frequency with which the measuring device MP sends the two above information on the network RE, with the aim of limiting the engagement of the communication network to a minimum possible extent.

Advantageously, the frequency of transmission of the information by the device MP depends right on the measured value of the electric power, which is related to the prefixed maximum limit; in other words, the more the value of the total power (or current) absorption detected by the meter MP approaches the maximum prefixed limit, the higher its transmission frequency; this will ensure prompt absorption self-adjustment interventions, actuated by the smart electric users and by those users that have become smart through the presence of the device AI according to the present invention Vice-versa, when the total power (or current) absorption is clearly below the maximum prefixed limit, the frequency of information transmission by the device MP will be low, since no particular actions for absorption self-adjustment are requested by the various electric users. As a result, the average engagement of the communication line will be a limited one, letting other possible devices also present in the house to utilize the same communication line for different purposes than those described above.

In general terms, the operation of the system represented in FIG. 3 in connection with the aim of rationalizing the absorption of electric power is as follows.

The electric energy for the household environment is drawn from the external mains system through the energy meter CE. As previously said, the power absorbed by the household environment is limited by an appropriate limiting device (not represented), which limits the power installed according to the power supply contract; in the example, for instance, a maximum limit Pmax of usable power is assumed equal to 3 kWh (contractual power).

Both the "smart" household appliances FO, LS and FG and the "dummy" users LB, COT and AU are supplied through standard current sockets; however, on the electric supply line of the "dummy" users a monitoring device AI according to the invention is present.

The control system of each "smart" household appliance, as for the control systems SC of the monitoring devices AI, periodically receive from the measuring device MP, with a frequency being variable according to the principle described above, the measured value of the total power PT absorbed by the entire household environment and the prefixed value Pmax of the maximum usable power.

The control system of each active "smart" household appliance verifies if the present value of the total power PT absorbed by the entire household environment is going to exceeded the value of the maximum usable power Pmax, as defined by the power supply contract and controlled through the above mentioned power limiter.

With reference to a dishwasher LS, if the value of the total power absorbed PT by the household environment, at the moment a certain operation cycle of said dishwasher LS is started, exceeds Pmax, then the control system will immediately reduce the power consumption of the relevant "smart" household appliance LS by a quantity higher or equal to the difference PT-Pmax; subsequently, the control system of the dishwasher LS will update itself to the new value of the total power PT absorbed by the several active users of the household environment, using the periodic communication of the measuring device MP.

On the contrary, if PT is lower or equal to Pmax, then the control system will verify the power absorption status of the relevant "smart" appliance LS in function of a likely change of the dishwasher operation mode.

If following this control, the "smart" appliance LS results in operating according to normal conditions, i.e. its absorbed power at that time is exactly that as required for its normal operation, the control system of the dishwasher LS will only update its internal memory with the total power absorbed by the household environment; however, without changing its operating procedure.

If, vice-versa, the control system of the dishwasher LS had been previously compelled to reduce the power consumption of the relevant appliance, it may now to decide for an increase in the power absorption, considering, however, that the maximum quantity of additional power cannot overcome the difference Pmax-PT, anyway.

Therefore, the control system of each "smart" household appliance FO, LS and FG has the capability of reducing or bring back to normal the absorption of electric power required by the particular phase of the operation cycle being performed by the appliance.

The system of self-adjustment of the power absorbed by each "smart" user may obviously be much more sophisticated than described above by mere way of example, but a further investigation of this aspect is excluded from the purposes of the present invention.

Obviously, the system described above provides priority rules between the various electric users, so as to warrant a dynamic power sharing in function of the type of household appliances being simultaneously active from time to time, and in function of the importance of the role performed by said appliances with respect to the consumer.

In fact, should for example both the oven FO and dishwasher LS be simultaneously active, the latter may automatically decide to give priority to the oven, since food cooking is considered a priority item against washing-up; as a result, the dishwasher would heat the water, for instance, only during the natural rest intervals of oven heating.

As regards the appliances LB, COT and AU, they may generally be assigned maximum priority, due to the lack of capacity of the respective device AI to perform a refined "dosage" of power absorption, since power can only be managed by it according to the ON/OFF procedure.

However, as previously mentioned, the monitoring device AI is able to recognize with good approximation the function the relevant household electric user is performing; as a result, if the phase of operation being performed by the electric user is not considered a critical one, the monitoring device AI may decide to interrupt the flow of electric current to the electric user, should it be required in order to avoid exceeding the limit of the contractual power, by opening the relay RNC (FIG. 2) under control of the microcontroller MC.

When the total power PT absorbed by the household environment is again below the value Pmax, the control system SC of the device AI may decide to close the relay RNC, so restoring the electric supply to the relevant user.

Moreover, also the fact that the monitoring device AI is able to generate and send on the network RE information being representative of the function the relevant electric user is performing, allows for further improving the efficiency of the energy management system in the household environment.

Let us assume, for instance, the case in which an air conditioner and a laundry washing machine LB both fitted with a monitoring device AI are simultaneously activated; let us also assume that the conditioner has by now determined the achievement of a room temperature close to the selected temperature, while the washing machine is just starting a spinning step. In this event, the control system SC of the device AI associated to the conditioner, duly programmed to that purpose, may decide to interrupt temporarily the current absorption of the conditioner (by opening its relay RNC), to let the washing machine accomplishing its operating phase; at the end of such a phase, the control system SC of the device AI associated to the conditioner will control the closure of the relay RNC, so allowing a new supply to the relevant electric user.

Concluding, through the managing procedure of the power absorption described above, the consumer will be able to activate several electric users simultaneously, both "smart" and conventional ones, the latter made "smart" by the presence of the device AI provided by the present invention. In this way, a theoretic global electric power by far higher than the power installed for the individual household environment can be engaged; however, without causing any blackouts or exceeding a prefixed maximum limit of usable power. Therefore, the monitoring device AI according to the present invention can be advantageously used also for the rationalization of the power consumption in a household environment.

With further reference to the description of FIG. 3, RT indicates a telephone line available in the household environment, to which a telephone set TE is connected for example; a telephone node NT is also connected to the line RT, used for the remote transmission of information to a likely Service and Preventive Maintenance Centre for the various electric users.

The node NT is equipped with proper means for
collecting periodically, through the same electric network RE, information of the functional, diagnostic and statistical type, generated by the users FO, LS, PG and the devices AI according to the invention, identifying for each one of them the relevant user they come from,
storing said information within proper non-volatile memory means,
making said information subsequently available outside through the telephone line, according to appropriate procedures.

These functions are performed by the device NT through known means, such as a duly programmed microcontroller, fitted with a suitable power line carrier interface module N and electronic memory means, being non-volatile but electrically updatable (such as a EEPROM or FLASH memory).

As described above, all information the node NT is able to collect, store and express are generated by the "smart" appliances FO, LS, FG and the devices AI according to the invention. The control system of each "smart" household appliance, or made "smart" by the availability of the device AI according to the invention, is programmed, in fact, with known techniques for periodically storing at least information of the diagnostic and statistical type in its non-volatile memory means, and update their contents in the time.

Moreover, the control system of each "smart" appliance, or made "smart" by the presence of the device AI according to the invention, is capable of generating and sending information of the functional type of different nature to the node NT, which are relating for example to the program or operation cycle activated by the consumer, to the status or progress phase of said program, to the commands or options selected by the consumer, to the timings associated to the activations and deactivations of the individual power loads, to possible anomalous behaviours of some components, etc.

Similarly, the control system of the telephone node NT is programmed for periodically requesting (for example every 10 minutes or other time intervals possibly programmable through convenient external means that may be associated to the same power line communication system), always through the communication line consisting of the electric network RE itself, the new information becoming available from time to time, generated by the control systems of each activated "smart" household appliance and control systems SC of the monitoring devices AI associated to the conventional active electric users; said information are collected inside appropriate non-volatile memory means available to the telephone node NT itself.

Therefore, the "data base" associated to the memory means of the telephone node NT is constantly updated and represents the image of the contents of the information being present inside the memory means of each "smart" household appliance and each device AI paired, according to the present invention, to conventional electric users.

The contents of said "data base" can be periodically sent, by the telephone node NT, to a Service and Preventive Maintenance Centre for the above purposes. The node NT, in fact, can be programmed for sending periodically (such as every 24 hours or other time intervals possibly programmable through convenient external means that may be associated to the same power line communication system) to a remote Service and Preventive Maintenance Centre, through the conventional switched telephone line and an appropriate conventional analog modem, said "base" containing all information made available on the electric network RE from the various "smart" appliances and the monitoring devices AI.

Preferably, the node NT also has appropriate input means, such as a keyboard, through which the consumer can activate at his personal discretion the transmission of such a "data base" to said remote Service Centre.

Said Service Centre is provided for servicing and preventive maintenance activity of the various household electric users, said activities being governed for instance by a specific contract signed with the consumer.

The service assistance is based on the diagnostic data sent to the Centre by the consumer through the telephone node NT, whereas the preventive maintenance activity is based—in addition to said diagnostic data—also and above all on the statistical data sent to the Service Centre, always through the telephone node NT.

Concerning the procedure for the transmission of information to the above Service and Preventive Maintenance Centre, this may be manual, i.e. managed directly by the consumer, or performed automatically (periodical transmission of information based on a specific service contract); in both instances, the transmission of information can be performed advantageously for the consumer calling a special toll-free telephone number of the above Centre.

It should be noticed, anyway, that the likely transmission of information through the telephone node NT to said remote Service Centre occurs in conformity with the privacy protection Standards in force in the various countries; in other words, such a transmission occurs under the full consumer's control, who may decide the kind of information to be sent, the transmission procedure and the relevant recurrence.

In this way, the personnel called for repair or maintenance operations to the various electric users has the possibility of having available information relating to the operation status and the "historical" events of the same electric users; according to the present invention, this is made possible, through the monitoring device AI, also for those electric users LB, COT and AU whose internal control systems are unable to generate such information on their own.

Back to FIG. 3, MC indicates a telephone node equipped with a GSM cellular modem, of known type, which can manage the transmission and the reception of digital data.

Compared to the node NT previously described, the telephone node MC uses a GSM modem instead of an analog modem, and the wireless communication instead of the communication based on the transmission of signals through a conventional telephone line. Also the telephone node MC is connected to the electric network RE through a same interfacing power line carrier module N.

Additionally, with TC an external GSM mobile telephone is indicated, being capable of digital communication with the telephone node MC, in particular through SMS type alphanumerical messages, which are easier to be managed by the consumer.

In general, the telephone node MC may be equipped with a control system and relevant memory means which allow for performing, besides its specific digital dialog functions with the consumer's GSM mobile telephone, also the same functions of the telephone node NT described above. However, availability of the telephone node MC, though optional, is particularly advantageous, if paired to a mobile telephone, for example in order to allow the consumer to directly control in a remote way the electric users in the household environment, both for the "smart" appliances and the appliances made "smart" according to the invention through a monitoring device AI.

Accordingly, in fact, operation of a given electric user can be controlled from a remote position through the mobile telephone TC; additionally, it is also possible to operate a change of such an operation.

The system may be conceived, for instance, so that the consumer can send alphanumerical commands, such as in the form of SMS messages, to the telephone node MC by means of his personal mobile telephone TC. Such types of messages may consist for instance of just three alphabetical and/or numerical characters, two of them indicating the requested function (such as "CS" for Check Status), and the remaining character indicating the electric user for which the status is requested (such as 1 for the dishwasher, 2 for the oven, 3 for the laundry washing machine, and so on).

On receipt of said message, the control logic of the telephone node MC can obtain the requested information questioning directly, though the communication network RE, the control system of the "smart" user or of the monitoring device AI associated to the conventional electric user of interest.

After receipt of the requested information, the control logic of the telephone node MC will inform the consumer through an appropriate message SMS, sent to the mobile telephone TC.

The telephone node MC and the mobile telephone TC may also be programmed for allowing the deactivation of a household electric user.

This operation can be performed, for instance, if the answer to a question about the operation status as mentioned above indicates that a certain electric user is active and the consumer wishes to put it off.

In this event, the consumer will send an appropriate SMS message, containing a power-off instruction for the specific electric user, to the telephone node MC through the mobile telephone TC.

Upon receiving such a message, the control system of the telephone node MC will transmit, through the network RE, an instruction to the control system of the "smart" appliance of interest, and the control system will stop the running operation cycle.

In the event of "dummy" household appliances, vice-versa, the control system of the telephone node MC will transmit through the network RE an appropriate instruction to the control system SC of the monitoring device AI of interest, which will provide for the opening of the relay RNC, with a consequent power cut-off of the relevant electric user.

A perfectly similar technique as described above may also be used for activating a household electric user.

Obviously, such an event presumes that the "smart" user of interest, or the user made "smart" by the presence of a device AI according to the invention, is anyway prefixed for the activation, i.e. with its main supply switch (ON/OFF button) in closed position and that its control system, or the control system of the relevant device AI, is in a stand-by status, waiting for the arrival of the instructions to activate the electric user.

Figure 4:
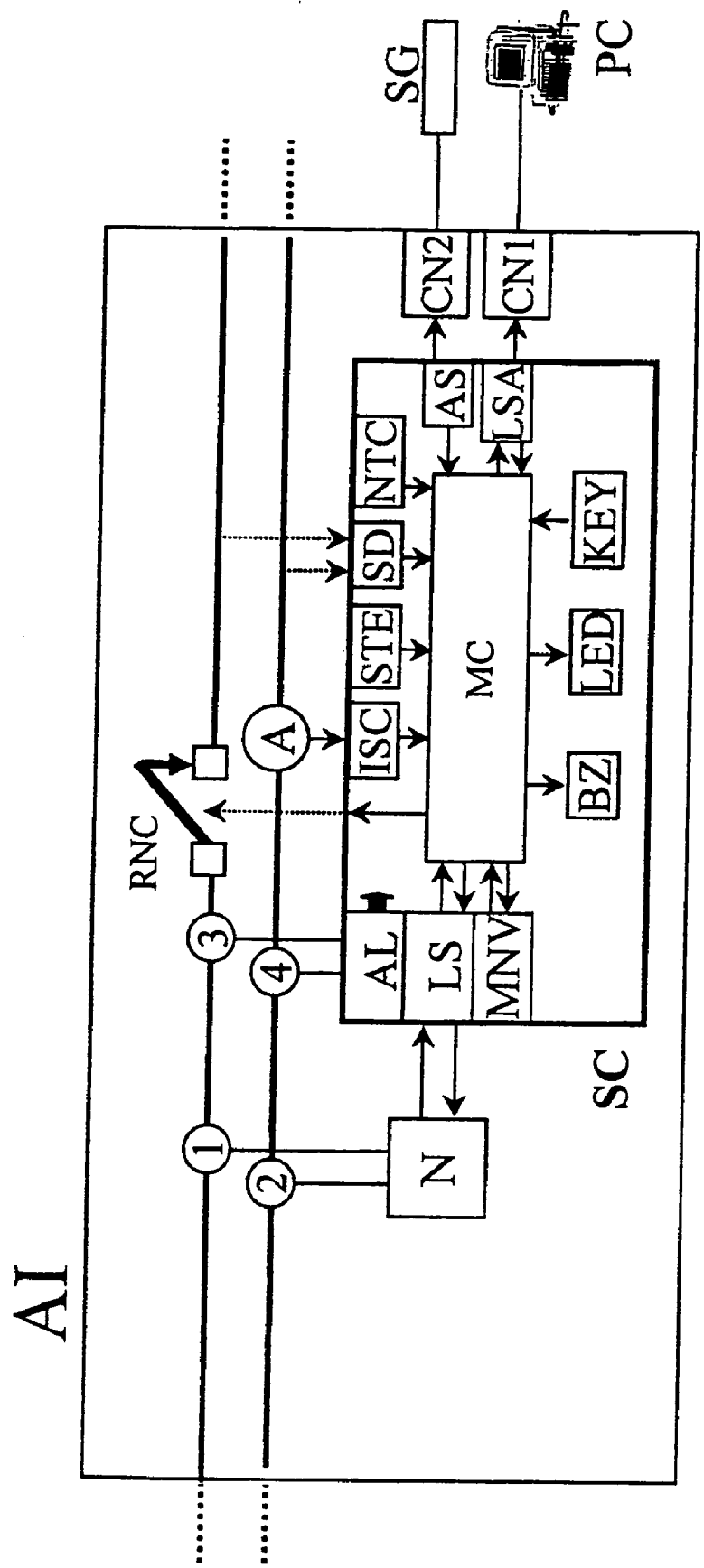
FIG. 4 shows schematically a second possible embodiment of the monitoring device according to the present invention.

In the specific instance of the device AI, it will provide appropriate means to let the consumer to preliminarily bring the relay RNC in the opening condition, i.e. a sort of stand-by position. Such means may consist, for example, of a simple control key arranged on the device AI and associated to a warning light indicating the status of the contact of the relay RNC; said control key and warning light are represented in FIG. 4, indicated with KEY and LED, respectively.

Therefore, by means of the button KEY, the consumer will be able, before leaving the house, to interrupt upstream the electric supply to the relevant electric user, though the opening of the contact of the relay RNC, and then close the ON/OFF switch of the electric user.

Should the consumer wish to activate the electric user of interest from a remote position, it will be enough to send the relevant instruction in the form of an SMS message, by means of the mobile telephone TC to the telephone node MC.

On receipt of said instruction, the control system of the telephone node MC will transmit, through the network RE, an instruction to the control system SC of the monitoring device AI of interest, which in turn controls the closure of the relay RNC; as a result the relevant electric user is supplied with power since its ON/OFF button is already in its closed position.

As to the control systems of the telephone node MC, of the "smart" users and the devices AI, they will be duly programmed for achieving the above functions with known techniques, which may also change from the ones previously described by way of non limiting example.

A monitoring device AI according to the present invention is represented in FIG. 4, which is equipped with additional functional elements with respect to FIG. 2. Said additional elements of FIG. 4. With respect to FIG. 2, consist of:
 a differential current sensor SD;
 a temperature sensor NTC;
 an asynchronous serial line LSA, with a connection port CN1 towards a personal computer PC or other analogous programmable apparatus;
 an acoustic signalling means BZ;
 an optical signalling means LED;
 manual input means KEY;
 an interface AS, with a relevant connection port CN2 towards other likely sensors SG.

The differential current sensor SD can be provided for detecting possible current dispersions to ground and can be realized in accordance to any known technique. Also the temperature sensor NTC is of the known type (such as a classic negative temperature coefficient resistor), whose function is to detect the value of the room temperature.

The asynchronous serial line LSA has the function of allowing, through a suitable port CN1, the connection of the device AI to a likely external personal computer PC or any other analogous programmable apparatus; this may be eventually provided for changing and/or updating the parameters and reference profiles contained in the control system SC. Another important function of the line LSA is that of allowing the questioning of the contents of the memory MNV of the device AI at a local level, for example through the above cited personal computer PC or other appropriate programmable apparatus, at least in terms of diagnostic and statistical information; this will make required information available locally to the personnel called for repair or service of the electric user.

It should now be pointed out that the possibility of use of the devices AI according to the invention, in connection with a household communication network or "bus" and a telephone node for the transmission of information to a remote location (such as, respectively, the network RE and the node NT and/or the node MC described with reference to FIG. 3), represents just an advantageous application of the present invention, through which both a diagnostic verification of the functionality and a control in terms of activation/deactivation of the relevant electric users can take place from a location being remote with respect to the household environment.

However, the monitoring device AI can be also provided for simply generating and storing information locally, for making them accessible to the technical personnel locally.

Accordingly, therefore, the device AI according to the invention might not be fitted with the communication node N and the relevant interface LS, since the retrieval of the required information contained in the memory means MNV could be easily executed by the technical personnel through a personal computer PC or other appropriate programmable apparatus, connected to the control system SC through the line LSA and the relevant port CN1.

The signalling means BZ represented in FIG. 4 may consist for example of an acoustic actuator or buzzer, whose purpose is to signal immediately to the consumer the occurrence of any operation irregularities of the electric user associated to the device AI.

More generally, the acoustic signalling means BZ may be particularly useful should the monitoring device AI according to the invention be paired to particular electric users, which for their own nature may prove dangerous for the consumer if used improperly. This is, for example, the instance of a hairdryer which, within the frame of the above described management of power absorption, should not be deactivated through the relay RNC of the device AI; this could induce the user to forget it near damp or even wet areas, with the possibility of being subsequently reactivated under high risk conditions for the consumer (electric shock or fire risks). In this event the device AI, by detecting according to the above procedures a situation of excessive power absorption of the entire household environment, will merely inform the consumer through an appropriate acoustic signal of the means BZ. The same applies also in the instance of an electric user consisting of an iron or similar appliance with a high power absorption.

The optical signalling means LED of FIG. 4 may consist of a simple luminescent diode (LED); its function is to inform the consumer, among other, the passage of the relay RNC from its closed condition to its open one, or vice-versa.

The input means KEY of FIG. 4 may consist of a simple push-button, through which the consumer can change the open/closed condition of the contact of the relay RNC.

The interface AS of FIG. 4, of known realization, may be provided for allowing the connection of the device AI according to the invention to other possible sensors SG being associated to home safety, such as a gas sensor, a flood sensor, a smoke sensor, etc.

Thus, in the event of any irregular situations detected by such sensing means SG, the control system SC of the device AI may cause activation of the signalling means BZ and/or control the transmission of an alarm signal through the telephone node NT and/or MC.

The features of the present invention result in being clear from the above, and are detailed in the annexed claims, which form an integral part of the present description.

Also the advantages of the present invention are clear from the above description and the relevant annexed claims.

In particular, according to the present invention, the person called for maintenance and/or repair of the household electric users equipped with the monitoring device AI, has the possibility of being informed of the operation status of said users, of their "historical" events and consequently of the wear status of theirs components.

Advantageously, the information of different types relating to the users equipped with the device AI can be transmitted to an appropriate external centre, with the aim of allowing an efficient remote servicing, even in the form of a "preventive" servicing of the users themselves, or be used locally to make it easier for servicemen to execute their task.

Moreover, the monitoring device AI according to the invention can also be used for the purposes of an efficient rationalization of the energy consumption in the household environment.

Finally, the device according to the invention can allow, when connected to appropriate communication means, the remote control of the associated electric user.

Therefore, the monitoring device AI according to the invention can be considered a universal accessory or tool, which can be adapted in a simple way to various types of household electric users, even of different manufacturers, and which is configurable in a simple and cost-effective way to this effect.

It is obvious that many changes are possible for the man skilled in the art to the monitoring device described above by way of example, without departing from the novelty spirit of the inventive idea.

A possible variant embodiment of the system described above consists in connecting to the network RE also a personal computer PC, as represented in FIG. 3, equipped with an appropriate power line carrier interface module N, and an appropriate software allowing the consumer to question either the telephone node NT, or directly the various "smart" electric users and/or the devices AI, for having access to all information contained in the relevant non-volatile memory means.

In this instance, therefore, all information of the functional, diagnostic and statistical type would be displayed on the screen of the personal computer PC, as requested by the consumer from time to time, through said software. Similarly, said personal computer PC, if fitted with an appropriate modem connected to the telephone line and provided with said software support, may be used by the consumer for carrying out the remote transmission of the information of the diagnostic and statistical type, to the outside. In such an event, the access to the remote site of the Service and Preventive Maintenance Centre would be advantageously possible also through the Internet.

The invention claimed is:

1. A monitoring device for monitoring a single household electric user presenting an electric load, the monitoring device being and including:

A. a detector, connected between a source of electric energy for the household electric user and the electric load of the single household electric user, determining at various times the quantity of electric power or current absorbed by the single household electric user, B. a memory for retaining pre-stored reference data or profiles of electric power or current that are absorbed during operating cycles of a corresponding type of electric user;

C. a processor for determining status information that is representative of the phase of operation of the single household electric user based on the quantities of electric power or current determined by the detector and the stored pre-stored reference values; and D. communication means for providing the status information to an external device.

2. The device, according to claim 1, wherein,
i. the processor further determines efficiency information being representative of the efficiency or performance status of the single household electric user based on the quantity of electric power or current determined by the detector and the stored reference values, and
ii. the communication means provides the efficiency information to an external device.

3. The device, according to claim 1, wherein,
i. the processor further determines wear information relating to estimating the wear status of components of the single household electric user, and
ii. the communication means provides the wear information to an external device.

4. The device, according to claim 1, wherein the reference data or profiles contained in the memory are representative of a theoretical level of absorption of electric power or current that the household electric user would absorb if operating correctly under normal conditions.

5. The device, according to claim 4, wherein the processor compares the quantities determined by the detector with the reference data or profiles to determine the status information.

6. The device, according to claim 1, wherein the processor provides the status information to the memory.

7. The device, according to claim 6, wherein the processor further:
a. determines efficiency information indicating the quality of operation of the single household electric user and/or the efficiency status of its internal components, the efficiency information relating to deviations which are considered significant between the quantities determined by the detector and the stored reference data or profiles,
b. determines wear information relating to the wear status of components of the single household electric user and/or the modes of previous use of the single household electric user, and
c. retains the efficiency and wear information in the memory.

8. The device, according to claim 1, wherein the communication means includes a connection to a communication bus, the communication means making the status information available to the bus and receiving instructions from the bus.

9. The device, according to claim 1, wherein the communication means is a connection to an external electronic apparatus the communication means providing the external electronic apparatus access to the status information and access to the programming of the device.

10. The device, according to claim 7, wherein the communication means is a connection to an external electronic apparatus, the communication means providing the external electronic apparatus access to the status, efficiency and wear information and access to the programming of the device.

11. The device, according to claim 1, further including a switch that operates under the control of the processor for interrupting the electric supply to the single household electric user.

12. The device, according to claim 8 further including a switch that operates under the control of the processor for interrupting the electric supply to the single household electric user, the processor controlling the switch based on instructions received over the bus.

13. The device, according to claim 1, further including configuration means for selecting, among a plurality of possible selections, the type of electric user that corresponds to the single household electric user.

14. The device, according to claim 13, wherein
a. the memory contains a plurality of reference data or profiles relating to the operations of various types of electric user, and
b. the configuration means selects the reference data or profile relating to the particular household electric user that is associated with the device.

15. The device, according to claim 11, further including manual controls for the switch.

16. The device, according to claim 1, further including
a. a current differential sensor for detecting current leaks to ground,
b. the processor using the sensor readings to analyse the operations of the single household electric user.

17. The device, according to claim 1, further including
a. a temperature sensor for sensing ambient temperature, and
b. the processor using the ambient temperature information to analyse the operations of the single household electric user.

18. The device, according to claim 1, wherein the communication means is an asynchronous serial line.

19. The device, according to claim 10, further including acoustic and/or optical signalling means under the control of the processor for signalling anomalous conditions of operation of the single household electric user.

20. The device, according to claim 12, further including acoustic and/or optical signalling means under the control of the processor for signalling the status of the switch.

21. The device, according to claim 12, wherein the processor receives information from one or more external sensors, where the one or more external sensors is a gas sensor, a flood sensor, or a smoke sensor, and the processor controls the switch to interrupt the electric supply based, in part, on the readings of the external sensors.

22. A method for monitoring the status of a single household electric user, the method including the steps of:
A. measuring the absorption of electric power or current by the single household electric user at various times;
B. analyzing the measured electric power or current absorption based on pre-stored reference electric power or current absorption data or profiles relating to operating cycles of an electric user of a corresponding type;
C. determining status information being indicative of the phase of operation of the single household electric user based on the results of step B; and
D. storing the status information.

23. The method of claim 22 further including
E. determining efficiency information relating to the efficiency Of the single household electric user during the operating cycles based on reference data or profiles and the measured absorption; and F. storing the efficiency information.

24. The method of claim 22 further including
E. determining wear information based on the number and types of operating cycles performed by the single household electric user; and
F. storing the wear information.

25. The method of claim 24 further including
G. determining efficiency information relating to the efficiency of the single household electric user during the operating cycles based on reference data or profiles and the measured absorption; and
h. storing the efficiency information.

26. The method, according to claim 22, wherein the absorption is measured instant by instant to determine an absorption profile which expresses the evolution in time of the real level of absorption of electric power or current by the single household electric user.

27. The method, according to claim 22, wherein the reference absorption profile is representative of the evolution in time of a theoretical level of absorption of electric power or current that the single household electric user would produce if operating correctly.

28. The method, according to claim 22 further including a step of selecting the reference absorption data or profile from among a plurality of reference absorption data sets or profiles.

29. The method, according claim 28, wherein the reference absorption data sets or profiles are obtained through experimental analysis.

30. The method, according to claim 22, wherein the status information is of the functional type, concerning the present mode of operation of the single household electric user.

31. The method, according to claim 23, wherein the efficiency information are of the diagnostic type, concerning the quality of operation of the single household electric user and/or the efficiency status of its internal components, the efficiency information resulting from the detection of deviations being considered significant between the measured absorption and the applicable reference absorption data or profile.

32. The method, according to claim 24, wherein the wear information are of the statistical type, concerning the wear status of internal components of the single household electric user and/or its modes of previous use.

33. The method, according to claim 32, wherein the wear information are determined based on an analysis of the status information over time.

34. The method, according to claim 24, further including the step of providing certain of the status, efficiency and/or wear information to a communication network to which a plurality of household electric users are connected.

35. The method, according to claim 34, wherein the information is used for estimating the functional and/or wear status of internal components of the single household electric user in aid in the repair and/or maintenance of the household electric user.

36. The method, according to claim 34, wherein certain of the information is used for rationing the electric power absorption in the household environment in which the electric user is installed.

37. The method, according to claim 36, further including the step of controlling, from a remote location, the operating status of the household electric user, for realizing the activation and/or deactivation of the user, based on the information provided over the communication network.

38. The method, according to claim 31, further including activation of acoustic and/or optical signalling means when the household electric user is malfunctioning.

39. A system for monitoring and controlling household appliances that utilize power from the electric mains, the system including:
A. one or more first household appliances that communicate over a communication network; and
B. one or more monitoring devices for monitoring and controlling a corresponding number of second household appliances, a given monitoring device communicating over the communication network on behalf of the associated single second household appliance and including:
 i. a detector for determining at various times the quantity of electric power or current absorbed by the associated second household appliance,
 ii. a memory for retaining pre-stored reference data or profiles of electric power or current absorbed during operating cycles of a corresponding type of household appliance;
 iii. a processor for determining status information that is representative of the phase of operation of the associated second household appliance based on the quantity of absorbed electric power or current determined by the detector and the stored pre-stored reference data or profiles; and
 iv. a node for communicating on the communication network, the node providing the status information over the network.

40. The system, according to claim 39, wherein
v. the monitoring device further determines efficiency information representative of the efficiency or performance status of the associated second household appliance based on the quantity of absorbed electric power or current determined by the detector and the stored reference data or profiles, and
vi. the node provides the efficiency information over the network.

41. The device, according to claim 39, wherein,
v. the monitoring device further determines wear information relating to estimating the wear status of components of the associated second household appliance, and
vi. the node provides the efficiency information over the network.

42. The device, according to claim 39, wherein the reference data or profiles are representative of a theoretical level of absorption of electric power or current that the associated second household appliance would absorb if operating correctly under normal operating conditions.

43. The system of claim 39 further including
v. a meter for measuring electric power or current absorbed by the household, the meter communicating the measured household absorption values over the communication network, and
vi. at each of the first household appliances limiting power or current absorption based on the communicated household absorption values and a predetermined maximum absorption value, and
vii. at each monitoring device limiting the power or current absorption by the associated second household apparatus based on the communicated household absorption values and a predetermined maximum absorption value.

44. The system of claim 43 wherein the meter communicates the household absorption value with variable frequency based on how close the measured household value is to the predetermined maximum value.

45. The system of claim 39 wherein the communication network is a powerline carrier network.

46. The system of claim 39 wherein the monitoring device controls the activation and deactivation of the associated second household appliance based on information communicated over the communication network.

47. The system of claim 46 wherein the monitoring device controls the second household appliance based on information provided to the network by an external device.

48. The system of claim 47 wherein the information is supplied to the network by a mobile telephone.

49. The system of claim 47 wherein the information is supplied to the network from a remote network.

50. The system of claim 49 wherein the remote network is the internet.

* * * * *